United States Patent [19]

Ando

[11] Patent Number: 5,376,720
[45] Date of Patent: Dec. 27, 1994

[54] CURABLE COMPOSITION

[75] Inventor: Naotami Ando, Hyogo, Japan

[73] Assignee: Kanegafuchi Kagaku Kogyo Kabushiki Kaisha, Osaki, Japan

[21] Appl. No.: 158,212

[22] Filed: Nov. 29, 1993

Related U.S. Application Data

[63] Continuation-in-part of Ser. No. 976,508, Nov. 13, 1992, abandoned.

[51] Int. Cl.$^5$ ............................................. C08L 23/04
[52] U.S. Cl. ...................................... 525/63; 525/100; 525/105; 525/106
[58] Field of Search ................... 525/63, 100, 105, 106

[56] References Cited

U.S. PATENT DOCUMENTS 4,975,488 12/1990 Furukawa et al. .................. 525/100

FOREIGN PATENT DOCUMENTS

78777/87 4/1988 Australia .
WO92/11328 7/1992 WIPO .

Primary Examiner—James J. Seidleck
Assistant Examiner—W. Robinson H. Clark
Attorney, Agent, or Firm—Varndell Legal Group

[57] ABSTRACT

A curable composition comprising
(A) a vinyl resin having at least one hydrolyzable silyl group in one molecule wherein the main chain substantially consists of a vinyl polymer and having no segment of a resin which has polymerizable double bonds at both ends of the main chain and a glass transition temperature of not more than 0° C.;
(B) a modified resin having at least one hydrolyzable silyl group in one molecule which is obtained by polymerizing
(a) a resin having polymerizable double bonds at both ends of the main chain and a glass transition temperature of not more than 0° C.,
(b) a hydrolyzable silyl group-containing vinyl monomer, and
(c) a vinyl monomer having no hydrolyzable silyl group; and
(C) a curing catalyst. The composition of the present invention enables to prepare a top coating having the excellent physical property balance between hardness and impact resistance or that between elongation and stain resistance.

4 Claims, No Drawings

CURABLE COMPOSITION

CROSS-REFERENCE TO RELATED APPLICATION

This is a continuation-in-part of application Ser. No. 07/976,508 filed on Nov. 13, 1992, now abandoned.

BACKGROUND OF THE INVENTION

The present invention relates to a curable composition, and more particularly to a curable composition suitable for use of various top coatings for outer walls of buildings, automobiles, household electric appliances, plastics and the like, especially, top coatings for products required to have weatherability, elasticity, flexibility and the like.

Hereinafter, a group containing silicon atom bonded to a hydrolyzable group is referred to as "hydrolyzable silyl group", and a vinyl polymer (monomer) having the hydrolyzable silyl group is referred to as "hydrolyzable silyl group-containing vinyl polymer (monomer)".

It is known that a hydrolyzable silyl group-containing vinyl polymer cures at ordinary temperature, and the cured product is a resin having good adhesion to inorganic substances such as concrete, glass, steel and aluminium and further having excellent weatherability (refer to Japanese Unexamined Patent Publication No. 36395/1979 and the like).

However, the cured film of the hydrolyzable silyl group-containing vinyl polymer generally has a defect of brittle. Therefore, it has been tried to blend the polymer with a soft component (soft resin) so as to abate the brittle by providing elasticity or flexibility to the film. However, as things are, such trial has not been practical yet by reason that the compatibility of a hydrolyzable silyl group-containing vinyl polymer with a soft component is extremely poor.

An object of the present invention is to provide a curable composition suitable for use of top coating and the like which maintains excellent weatherability and good adhesion inorganic to substances being originally possessed by the hydrolyzable silyl group-containing vinyl polymer, and further has an excellent physical property balance between stain resistance and elongation or that between impact resistance and hardness.

This and other objects of the present invention will become apparent from the description hereinafter.

SUMMARY OF THE INVENTION

It has now been found that a soft component having an improved compatibility with the hydrolyzable silyl group-containing vinyl polymer to a practically usable extent is obtained when a vinyl polymer having a soft segments is prepared by introducing polymerizable double bonds to a soft resin at its both molecular ends and polymerizing with a hydrolyzable silyl group-containing vinyl monomer and another vinyl monomer having no hydrolyzable silyl group.

In accordance with the present invention, there is provided a curable composition comprising (A) a vinyl resin having at least one hydrolyzable silyl group in one molecule wherein the main chain substantially consists of a vinyl polymer and having no segment of a resin which has polymerizable double bonds at both end of the main chain and a glass transition temperature of not more than 0° C.;

(B) a modified resin having at least one hydrolyzable silyl group in one molecule which is obtained by polymerizing
   (a) a resin having polymerizable double bonds at both ends of the main chain and a glass transition temperature (hereinafter referred to as "Tg") of not more than 0° C.,
   (b) a hydrolyzable silyl group-containing vinyl monomer, and
   (c) a vinyl monomer having no hydrolyzable silyl group; and (C) a curing catalyst.

According to the curable composition as mentioned above, the object of the present invention can be attained. That is, although the vinyl resin (A) is brittle, such a deficiency of the vinyl resin (A) is removed and elasticity or flexibility thereof can be improved by adding the modified soft resin (B) to the vinyl resin (A) according to the present invention.

DETAILED DESCRIPTION

The vinyl resin (A) of the present invention is, for instance, obtained by copolymerizing a vinyl monomer and a hydrolyzable silyl group-containing monomer. The vinyl resin (A) may contain an urethane bond, siloxane bond, or the like in a part of its main or branched chain so long as the amount is not more than 50% by weight based on the whole resin.

The vinyl monomers as material of the vinyl resin (A) are not particularly limited. Typical examples of the vinyl monomers are, for instance, a (meth)acrylate (acrylate or methacrylate, hereinafter the same) such as methyl (meth)acrylate, ethyl (meth)acrylate, butyl (meth)acrylate, 2-ethylhexyl (meth)acrylate, stearyl (meth)acrylate, benzyl (meth)acrylate, cyclohexyl (meth)acrylate, trifluoroethyl (meth)acrylate, pentafluoropropyl (meth)acrylate, perfluorocyclohexyl (meth)acrylate, acrylonitrile, methacrylonitrile, glycidyl (meth)acrylate, dimethylaminoethyl (meth)acrylate, diethylaminoethyl (meth)acrylate, 2-hydroxyethyl (meth)acrylate or 2-hydroxypropyl (meth)acrylate; a (meth)acrylamide (acrylamide or methacrylamide, hereinafter the same) such as (meth)acrylamide, $\alpha$-ethyl (meth)acrylamide, N-butoxymethyl (meth)acrylamide, N,N-dimethyl acrylamide, N-methyl acrylamide or N-methylol (meth)acrylamide; acryloyl morpholine; "Aronix M-5700" (which is commercially available from Toagosei Chemical Industry Co., Ltd. ), "AS-6", "AN-6", "AA-6", "AB-6", "AK-5" (which are macromers commercially available from Toagosei Chemical Industry Co., Ltd.), "Placcel FA-1", "Placcel FA-4", "Placcel FM-1", "Placcel FM-4" (which are commercially available from Daicel Chemical Industries, Ltd.); a phosphate group-containing vinyl compound which is a condensation product of a hydroxyalkyl ester of $\alpha$, $\beta$-ethylenically unsaturated carboxylic acid such as a hydroxyalkyl ester of acrylic or methacrylic acid with phosphoric acid or a phosphoric ester; an aromatic hydrocarbon vinyl compound such as styrene, $\alpha$-methylstyrene, chlorostyrene, styrenesulfonic acid, 4-hydroxystyrene or vinyl toluene; an unsaturated carboxylic acid such as maleic acid, fumaric acid or iraconic acid, its salt (an alkali metal salt, ammonium salt, amine salt, etc.), its anhydride (maleic anhydride, etc.), its ester including a diester or half ester of the above unsaturated carboxylic acid or anhydride with an alcohol with 1 to 20 carbon atoms having a linear or branched chain; a vinyl ester such as vinyl acetate or vinyl propionate; an allyl compound such as diallyl phthalate; an amino group-containing vinyl compound such as vinylpyridine or aminoethyl vinyl ether; an amide group-containing vinyl compound such as itaconic acid diamide, crotonamide, maleic acid diamide, fumaric acid diamide or N-vinylpyrrolidone; other vinyl compound such as 2-hydroxyethyl vinyl ether, methyl vinyl ether, cyclohexyl vinyl ether, vinyl chloride, vinylidene chloride, chloroprene, propylene, butadiene, isoprene, fluoroolefin, maleimide, N-vinylimidazole or vinylsulfonic acid; and the like.

Such vinyl monomer may be used alone, if necessary, as a mixture thereof.

Typical examples of the hydrolyzable silyl group-containing monomers as material of the vinyl resin (A) are, for instance, silane derivatives having at least one unsaturated bond in each molecule such as

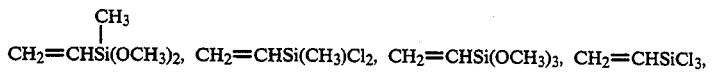

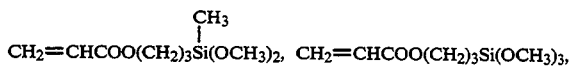

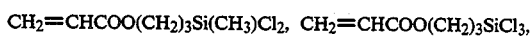

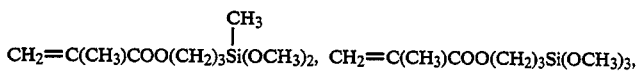

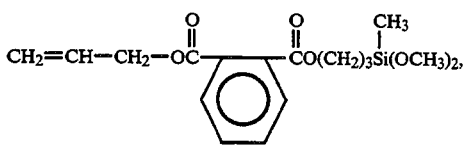

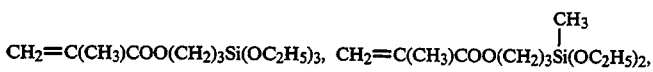

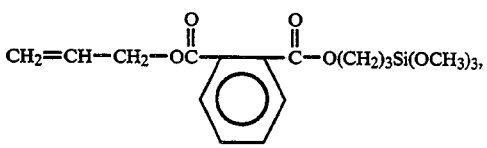

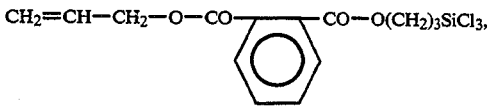

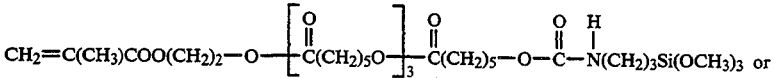

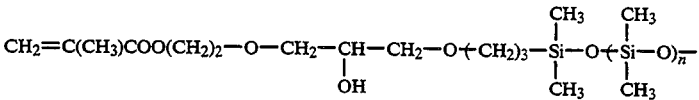

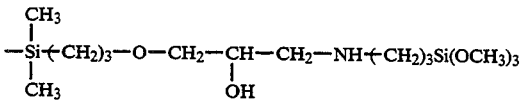

The hydrolyzable silyl group-containing monomers also include an acrylate or methacrylate having the alkoxysilyl group at the molecular ends through an urethane bond or a siloxane bond and the like as well as the above-mentioned monomers.

The above-mentioned hydrolyzable silyl group-containing monomer may be used alone, if necessary, as a mixture thereof, in the same manner as in the case of the above-mentioned vinyl monomer.

In case of especially requiring elasticity in a cured product, it is preferable to use a hydrolyzable silyl group-containing monomer having two functional groups (hydrolyzable groups) as methyldimethoxysilyl group or methyldiethoxysilyl group.

A method for polymerizing the vinyl monomer and the hydrolyzable silyl group-containing monomer is not particularly limited. For instance, the vinyl resin (A) of the present invention can be prepared according to the process described Japanese Unexamined Patent Publications No. 36395/1979, No. 36109/1982 and No. 157810/1983 or the like. Especially, solution polymerizations using an azo radical polymerization initiator such as azobisisobutyronitrile are preferable by reason of easy handing and the like.

If necessary, in the above solution polymerizations, there may be used one or more chain transfer agents for controlling the molecular weight of the vinyl resin (A). Examples of the chain transfer agents are, for instance, n-dodecyl mercaptan, t-dodecyl mercaptan, n-butyl mercaptan, $\gamma$-mercaptopropyltrimethoxysilane, $\gamma$-mercaptopropyltriethoxysilane, $\gamma$-mercaptopropylmethyldimethoxysilane, $\gamma$-mercaptopropylmethyldiethoxysilane, $(CH_3O)_3Si-S-S-Si(OCH_3)_3$, $(CH_3O)_3Si-S_8-Si(OCH_3)_3$, and the like.

Particularly, when adding the chain transfer agent(s) having the hydrolyzable silyl group in its molecule, such as $\gamma$-mercaptopropyltrimethoxysilane into a mixture of the monomers and succesively supplying the agents(s) in a amount consumed during the polymerization, it is possible to introduce the hydrolyzable silyl group into the vinyl polymer with controlling molecular weight of the vinyl resin (A).

Non-reactive solvents with the monomers as material, and the like can be used in the above-mentioned solution polymerizations without particular limitations. Examples of the non-reactive solvents are, for instance, hydrocarbons such as toluene, xylene, n-hexane and cyclohexane; acetic esters such as ethyl acetate and butyl acetate; alcohols such as methanol, ethanol, isopropanol and n-butanol; ethers such as ethylene glycol monoethyl ether, ethylene glycol mono-n-butyl ether and ethylene glycol monoethyl ether acetate; ketones such as methyl ethyl ketone, ethyl acetoacetate, acetylacetone, diacetone alcohol, methyl isobutyl ketone and acetone, and the like.

The molecular weight of the vinyl resin (A) of the present invention is not particularly limited. It is preferable that the number average molecular weight of the vinyl resin (A) is from 2,000 to 80,000, more preferably from 3,000 to 25,000, from the viewpoint of workability, stability, appearance of film (luster observed with eyes) and the like.

Since the main chain of the vinyl resin (A) of the present invention substantially consists of the vinyl polymer chain, the cured product shows weatherability, chemical resistance and the like.

Further, the vinyl resin (A) has, in one molecule, at least one, preferably not less than two hydrolyzable silyl groups which are hydrolyzed in the presence of humidity to produce silanol group and then cause crosslink and cure with siloxane bond produced by condensation of the silanol group. Therefore, the vinyl resin (A) can cure at ordinary temperature in the presence of humidity. Furthermore, because siloxane bond is chemically stable, the cured product shows weatherability and chemical resistance.

The modified soft resin (B) of the present invention is obtained by polymerizing the soft resin (a) having polymerizable double bonds at both ends of the main chain and a Tg of not more than 0° C., the vinyl monomer (b) having hydrolyzable silyl group and the vinyl monomer (c) having no hydrolyzable silyl group, and has at least one hydrolyzable silyl group in one molecule. The above-mentioned vinyl resin (A) has no segment of the soft resin (a), and therefore it is distinct from the modified soft resin (B). The modified soft resin (B) has a structure wherein a vinyl polymer similar to the vinyl resin (A) is substantially crosslinked with the soft resin (a).

The modified soft resin (B) has excellent elasticity and flexibility because it contains a soft component. By reason that the vinyl monomer (b) or (c) polymerizes at polymerizable double bonds of both ends of the molecule of the soft resin (a) having a Tg of not more than 0° C., compatibility of the vinyl resin (A) with the modified soft resin (B) is improved to fully show excellent features. As a result, there can be obtained the well-balanced cured product between elongation and stain resistance, or between hardness and impact resistance, which has excellent weatherability, chemical resistance and adhesion to inorganic substrates.

The soft resin (a) having a Tg of not more than 0° C. is not particularly limited. The soft resin (a) which has a Tg of not more than $-3°$ C. is preferable. Examples of the soft resin (a) are, for instance, a polyester such as a polyester having ester groups in its main chain prepared by polycondensation of a polycarboxylic acid and a polyhydric alcohol, and a polyester prepared by ring-opening polymerization of a lactone, a polyether such as a polyether having three or more oxyalkylene units, a polycarbonate, an olefin oligomer and the like. Examples of the above-mentioned olefin oligomer are, for instance, polyisobutylene, polybutadiene, hydrogenated poly-butadiene, polyisoprene and the like. Especially, a polyester is preferable from the viewpoint of weatherability, compatibility and costs. Among them, polycaprolactone and polyvalerolactone are most preferable. Polyvalerolactone is excellent in acid resistance.

The soft resin (a) having a Tg of not more than 0° C. may be a resin having an urethane bond in the molecule. Existence of urethane bond in the soft resin (a) increases cohesion to give a tough cured product.

With respect to the molecular weight of the soft resin (a) having a Tg of not more than 0° C., the number average molecular weight thereof is from 1,000 to 30,000, preferably 2,000 to 30,000, more preferably from 2,000 to 20,000 from the viewpoint of compatibility. Process for introducing polymerizable double bonds at both ends of the molecule of the soft resin so as to give the soft resin (a) is not particularly limited. For instance, the following processes (1)–(5) are exemplified.

The soft resin having hydroxyl groups at both ends used in the following methods for obtaining the soft resin (a) are not particularly limited. Examples of the soft resin are, for instance, polyesters such as "Placcel L-212AL", "Placcel L-220AL" and "Placcel L-230AL" (which are commercially available from Daicel Chemical Industries, Ltd.), "Kurapole P-1010","Kurapole P-2010", "Kurapole L-1010" and "Kurapole L-2010" (which are commercially available from KURARAY CO., LTD.); polycarbonates such as "Nipporan N-982" (which is commercially available from Nippon Polyurethane Ind. Co., Ltd.); olefin oligomers such as "R-45HT", "R-15HT" and "PIP-H" (which are commercially available from IDEMITSU PETROCHEMISTRY CO., LTD.); polyethers such as "D-1000", "D-1200" and "D-2000" (which are commercially available from Nippon Yushi Kabushiki Kaisha), "Exenol 1020", "Exenol 2020" and "Exenol 3020" (which are commercially available from Asahi Glass Co., LTd.); and the like.

(1) Process for preparing the soft resin (a) having polymerizable double bonds at both ends of the molecule and a Tg of not more than 0° C. by reacting a soft resin having hydroxyl groups at both ends with a two functional isocyanate compound such as isophorone diisocyanate or hexamethylene diisocyanate to give a soft resin having isocyanate groups at both ends, and then reacting the isocyanate groups at both ends with a hydroxyl group-containing vinyl monomer.

Examples of the above-mentioned hydroxyl group-containing vinyl monomers are, for instance, 2-hydroxyethyl (meth)acrylate, 2-hydroxypropyl (meth)acrylate, 2-hydroxyethyl vinyl ether, N-methylol (meth)acrylamide, "Aronix M-5700" (which is commercially available from Toagosei Chemical Industry Co., Ltd.), 4-hydroxyl styrene, "HE-10", "HE-20", "HP-10" and "HP-20" (which are acrylate oligomers having hydroxyl group at the oligomer end, commercially available from Nippon Shokubai Kagaku Kogyo Kabushiki Kaisha), "Blenmer PP series (polypropylene glycol methacrylate)", "Blenmer PE series (polyethylene glycol monomethacrylate)", "Blenmer PEP series (polyethylene glycol polypropylene glycol methacrylate)", "Blenmer AP-400 (polypropylene glycol monoacrylate)", "Blenmer AE-350 (polyethylene glycol monoacrylate)", "Blenmer NKH-5050 (polypropylene glycol polytrimethylenemonoacrylate)" and "Blenmer GLM (glycerol monomethacrylate)" (which are commercially available from Nippon Yushi Kabushiki Kaisha), a ε-caprolactone-modified hydroxyalkyl vinyl monomer, obtained by the reaction of a hydroxyl group-containing vinyl compound with ε-caprolactone, and the like. When the ε-caprolactone-modified hydroxyalkyl vinyl monomer is used as the hydroxyl group-containing vinyl monomer, the impact resistance and the fastness to bend of the cured product can be improved.

Examples of the ε-caprolactone-modified hydroxyalkyl vinyl monomers are, for instance, vinyl monomers represented by the formula (I):

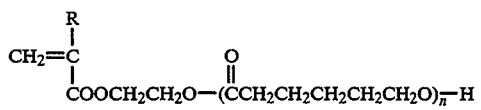

(I)

wherein R is H or CH$_3$ and n is an integer of not less than one. Examples of the monomers being commercially available are, for instance, "Placcel FA-1" (a vinyl monomer (I) wherein R is H and n is 1) and "Placcel FA-4" (a vinyl monomer (I) wherein R is H and n is 4), "Placcel FM-1" (a vinyl monomer (I) wherein R is CH$_3$ and n is 1), "Placcel FM-4" (a vinyl monomer (I) wherein R is CH$_3$ and n is 4) (which are commercially available from Daicel Chemical Industries, Ltd.); "TONE M-100" (a vinyl monomer (I) wherein R is H and n is 2), "TONE M-201 (a vinyl monomer (I) wherein R is CH$_3$ and n is 1) (which are commercially available from UCC Kabushiki Kaisha), and the like.

The hydroxyl group-containing vinyl monomer may be used alone or as an admixture thereof, if necessary.

In order to accelerate the reaction of isocyanate group with hydroxyl group, an organotin compound such as dibutyl tin dilaurate may be used as catalyst.

(2) Process for preparing the soft resin (a) having polymerizable double bonds at both ends of the molecule and a Tg of not more than 0° C. by reacting a soft resin having hydroxyl groups at both ends with maleic anhydride.

(3) Process for preparing the soft resin (a) having polymerizable double bonds at both ends of the molecule and a Tg of not more than 0° C. by reacting a soft resin having hydroxyl groups at both ends with (meth)acryloylisocyanate or the like.

(4) Process for preparing the soft resin (a) having allyl groups at both ends by reacting both hydroxyl groups of a soft resin having hydroxyl groups at both ends with a basic compound such as sodium hydroxide or sodium methoxide, then reacting with allyl chloride, and removing a salt being byproduct.

(5) Process for preparing the soft resin (a) having polymerizable double bonds at both ends of the molecule by reacting a soft resin having hydroxyl groups at both ends with an alkoxysilyl group-containing vinyl monomer such as vinyltrimethoxysilane or trimethacryloyloxypropyltrimethoxysilane in the presence of a catalyst such as an organo titanate.

Further, as the vinyl monomer (b) having hydrolyzable silyl group and the vinyl monomer (c) having no hydrolyzable silyl group, which are polymerizable with the soft resin (a) having a Tg of not more than 0° C., can be similarly used the vinyl monomers previously described in connection with synthesis of the vinyl resin (A). Also, processes for polymerization can be used in the same manner as the synthesis in the vinyl resin (A).

The polymerization of the soft vinyl (a) having a Tg of not more than 0° C., the vinyl monomers (b) and (c) may be carried out, for instance, by adding dropwise a mixture thereof with a polymerizing initiator to a solvent with which a reactor was previously charged.

It is preferable that an azo radical polymerization initiator such as azobisisobutyronitrile is used as a polymerization initiator from the viewpoint of easy handling.

The amount of the soft resin (a) having a Tg of not more than 0° C. is usually from 5 to 500 parts by weight, preferably from 20 to 300 parts by weight, based on 100 parts by weight of the total amount of the vinyl monomers (b) and (c) which polymerize with the soft resin (a). When the amount of the soft resin (a) is less than 5 parts by weight, there can not appear effects caused by introducing a soft component in elasticity and flexibility. In contrast, when the amount of the soft resin (a) is more than 500 parts by weight, compatibility of the vinyl resin (A) with the modified soft resin (B) is lowered and the cured product is apt not to show the desired physical properties. Therefore, the both cases are not preferable. The amount of the hydrolyzable silyl group-containing vinyl monomer (b) is preferably from 3 to 50 parts by weight, more preferably from 5 to 30 parts by weight, based on 100 parts by weight of the total amount of the vinyl monomers (b) and (c) from the viewpoint of curability and physical properties of film.

The polymerization initiator is used in an amount not less than 0.3 mol, preferably not less than 0.5 mol, based on 1 mol of the soft resin (a) having a Tg of not more than 0° C. When the amount of the initiator is less than 0.3 mol, it is not preferable by reason of possibility of gelation. Also, gelation can be effectively inhibited by properly using a chain transfer agent. Examples of the chain transfer agents are, for instance, n-dodecyl mercaptane, t-dodecyl mercaptane, n-butyl mercaptane, γ-mercaptopropyltrimethoxysilane, γ-mercaptopropyltriethoxysilane, γ-mercaptopropylmethyldimethoxysilane, γ-mercaptopropylmethyldiethoxysilane, $(CH_3O)_3$-Si—S—S—Si$(OCH_3)_3$, $(CH_3O)_3$Si—S$_8$—Si$(OCH_3)_3$.

The amount of the chain transfer agent is usually from 0.1 to 20 parts by weight, preferably from 0.2 to 10 parts by weight, based on 100 parts by weight of the total amount of the vinyl monomers (b) and (c). When the amount of the chain transfer agent is less than 0.1 part by weight, effect thereof is small. On the other hand, when the amount of the chain transfer agent is more than 20 parts by weight, weatherability of the cured product tends to bad. Therefore, both cases are not preferable.

It is preferable that the number average molecular weight of the modified soft resin (B) to be used is from 3,000 to 50,000, more preferably from 4,000 to 25,000 from the viewpoint of workability, stability, appearance, compatibility with the vinyl resin (A) and the like, although the number average molecular weight of the modified soft resin (B) greatly varies in dependent on the molecular weight of the used soft resin (a).

With respect to the mixing ratio of the vinyl resin (A) and the modified soft resin (B), the amount of the modified soft resin (B) is usually from 10 to 1,000 parts by weight, preferably from 20 to 500 parts by weight, based on 100 parts of the vinyl resin (A). When the amount of the modified soft resin (B) is less than 10 parts by weight, various properties such as elasticity and flexibility which are caused by the modified soft resin (B) can not be fully shown. In contrast, when the amount of the modified soft resin (B) is more than 1,000 parts by weight, hardness and stain resistance, and the like lower. Therefore, the both cases are not preferable.

Examples of the curing catalyst (C) used in the present invention are, for instance, an organotin compound such as dibutyl tin dilaurate, dibutyl tin dimaleate, dioctyl tin dilaurate, dioctyl tin dimaleate or tin octoate; a phosphoric acid or phosphoric ester such as an acid phosphate, monomethyl phosphate, monoethyl phosphate, monobutyl phosphate, monooctyl phosphate, monodecyl phosphate, dimethyl phosphate or diethyl phosphate, dibutyl phosphate or dioctyl phosphate, didecyl phosphate; an alkyl titanate compound, an organic aluminum compound such as tris(ethylacetoacetate)aluminum or tris-(acetylacetonate)aluminum; an organic zirconium compound such as tetrabutyl zirconate, tetrakis-(acetylacetonato)zirconium, tetraisobutyl zirconate or butoxytris(acetylacetonato)zirconium; an acidic compound such as maleic acid, adipic acid, azelaic acid, sebacic acid, itaconic acid, citric acid, succinic acid, phthalic acid, trimellitic acid, pyromellitic acid, or its anhydride or p-toluenesulfonic acid; an amine such as hexylamine, di-2-ethyl-hexylamine, N,N-dimethyldodecylamine or dodecylamine; a reaction product or a mixture of the amine as mentioned above with the acid phosphate; an alkaline compound such as sodium hydroxide or potassium hydroxide; and the like.

Among these curing catalysts (C), there are preferable the organotin compound, the acid phosphate, the reaction product of the acid phosphate and the amine, the amine, the organic titanate compound, the organic aluminum compound, and a mixture thereof, since these compounds have high activity.

The curing catalyst (C) may be used alone or as a mixture thereof.

The amount of the curing catalyst (C) is not particularly limited. The amount is usually from 0.01 to 20 parts by weight, preferably from 0.01 to 10 parts by weight, based on 100 parts by weight of the total amount of the vinyl monomer (A) and the modified soft resin (B) (solid matter). When the amount of the curing catalyst (C) is less than 0.01 part by weight, the curability tends to lower. On the other hand, when the amount of the component (C) is more than 20 parts by weight, the appearance of the film tends to bad.

In the curable composition of the present invention, a dehydrating agent is not essential. However, it is preferable to add one or more dehydrating agents to the composition of the invention, in order to ensure stability suitable for long-term repeated use.

Examples of the dehydrating agents are, for instance, hydrolyzable ester compounds such as methyl orthoformate, ethyl orthoformate, methyl orthoacetate, ethyl orthoacetate, methyltrimethoxysilane, γ-methacryloyloxypropyltrimethoxysilane, vinyltrimethoxysilane, methyl silicate and ethyl silicate, and the like.

The amount of the dehydrating agent is not particularly limited. The amount is usually not more than 100 parts by weight, preferably not more than 50 parts by weight, based on 100 parts by weight of the vinyl monomer (A) and the modified soft resin (B) (solid matter). These hydrolyzable ester compound may be added to either the vinyl resin (A) or the modified soft resin (B), or the both at a step before each polymerization, during polymerization or after polymerization. Also, the hydrolyzable ester compound may be added to a blend of the vinyl resin (A) with the modified soft resin (B) after blending.

The curable composition of the present invention is usually a transparent liquid having a viscosity from several cp to tens of thousands cp, although the composition varies in dependent on use, kinds and amount of additives, and the like.

In the curable composition of the present invention there may be added according to the uses thereof various additives such as pigments, dyes, ultraviolet absorbers such as a polymerization-type ultraviolet absorbers, photostabilizers such as a polymerization-type photostabilizer, agents for preventing precipitation and leveling agents; celluloses such as nitrocellulose and cellulose acetate butyrate; resins such as alkyd resins, acryl resins, vinyl chloride resins, chlorinated propylene resins, chlorinated rubbers and polyvinyl butyral, and the like.

The present invention is more specifically described and explained by means of the following Reference Examples, Examples and Comparative Examples in which all % and part(s) are by weight unless otherwise noted. It is to be understood that the present invention is not limited to the Examples and various changes and modifications may be made in the present invention without departing from the spirit and scope thereof.

Reference Examples 1 and 2

[Preparation of the vinyl resins (A-1) and (A-2)]

A reactor equipped with a stirrer, a thermometer, a nitrogen inlet tube, a dropping funnel and a condenser was charged with 360 g of xylene, and the reactor was heated to 110° C., with introducing nitrogen gas through the nitrogen inlet tube thereto. A mixture (A-1) or (A-2) as shown in Table 1 was added dropwise to the reactor continuously through the dropping funnel over 5 hours.

After completing the addition of the mixture (A-1) or (A-2), a solution obtained by dissolving 1.0 g of azobisisobutyronitrile in 100 g of toluene was added to the reactor over 1 hour. After completing the addition, postpolymerization was carried out for 1 hour. In the both resin solutions (A-1) and (A-2), the polymerization conversion was 97%. Then, each of the reaction mixture was diluted with xylene to give the resin solution (A-1) or (A-2) having a non-volatile matter concentration of 50%. The molecular weights measured by GPC method of thus obtained resins (A-1) and (A-2) are shown in Table 1.

TABLE 1

|  | Ref. Ex. 1 (g) | Ref. Ex. 2 (g) |
| --- | --- | --- |
| n-Butyl acrylate | 292 | 138 |
| Methyl methacrylate | 340 | 437 |
| n-Butyl methacrylate | 290 | 280 |
| γ-Methacryloyloxypropyl-methyldimethoxysilane | 68 | 135 |
| Acrylamide | 10 | 10 |
| Azobisisobutyronitrile | 9 | 15 |
| Number average molecular weight | 15,000 | 10,000 |
| Resin name | A-1 | A-2 |

Reference Example 3

[Preparation of the soft resin (a-1) having polymerizable double bonds at both ends of the main chain]

A reactor equipped with a stirrer, a thermometer, a nitrogen inlet tube and a condenser, was charged with 75 g of butyl acetate, 150 g of a polycaprolactone having hydroxyl groups at the both ends (commercially available under the trade name "Placcel L230AL" from Daicel Chemical Industries, Ltd.), 22.9 g of isophorone diisocyanate and 0.002 g of dibutyl tin dilaurate was heated at 110° C. for 3 hours. Sucessively, to the reaction mixture were added 59.8 g of a caprolactone-modified methacrylate (commercially available under the trade name "Placcel FM-4" from Daicel Chemical Industries, Ltd.), 25 g of butyl acetate and 0.1 g of Yoshinox BHT (the antioxidant which is commercially available from Yoshitomi Pharmaceutical Industries, Ltd.) and then was reacted at 100° C. for 5 hours. After the completion of the reaction, the reaction mixture was diluted with butyl acetate to give a solution of the soft resin (a-1) having a non-volatile matter concentration of 65%. In Table 2, the used material and the amounts thereof are shown. Further, Table 2 shows the molecular weight measured by GPC method of thus obtained soft resin (a-1).

Reference Example 4

[Preparation of the soft resin (a-2) having polymerizable double bonds of both ends of the main chain]

In the same manner as in Reference Example 3 except that the used material and the used amount of the material were changed as shown in Table 2, a solution of the soft resin (a-2) having a non-volatile matter concentration of 65% was obtained. Table 2 shows the molecular weight measured by GPC method of thus obtained soft resin (a-2). In Table 2, "Nipporan N-982" means the polycarbonate which is commercially available from NIPPON POLYURETHANE INDUSTRY CO., LTD.

TABLE 2

|  | Ref. Ex. 3 (g) | Ref. Ex. 4 (g) |
| --- | --- | --- |
| Butyl acetate | 75 | 75 |
| Placcel L-230AL | 150 | — |
| Nipporan N-982 | — | 150 |
| Isophorone diisocyanate | 22.9 | 25.2 |
| Dibutyl tin dilaurate | 0.002 | 0.002 |
| Placcel FM-4 | 59.8 | — |
| 2-Hydroxyethyl methacrylate | — | 9.75 |
| Butyl acetate | 25 | 15 |
| Yoshinox BHT | 0.1 | 0.1 |
| Number average molecular weight | 4,620 | 4,670 |
| Resin name | a-1 | a-2 |

Reference Examples 5 and 6

[Preparation of the modified soft resins (B-1) and (B-2)]

A reactor equipped with a stirrer, a thermometer, a nitrogen inlet tube, a dropping funnel and a condenser tube was charged with 100 g of butyl acetate and the reactor was heated to 110° C., with introducing nitrogen gas through the nitrogen inlet tube thereto. A mixture (B-1) or (B-2) as shown in Table 3 was added dropwise to the reactor continuously through the dropping funnel over 3 hours.

After completing the addition of the mixture (B-1) or (B-2), a solution obtained by dissolving 0.4 g of azobisisobutyronitrile in 20 g of toluene was added to the reactor for 1 hour.

Then, postpolymerization was carried out for 1 hour. Sucessively, thereto were added 13 g of methyl orthoacetate and 4 g of methanol. In the both resin solutions (B-1) and (B-2), the polymerization conversion was 95%. Then, each of the reaction mixture was diluted with butyl acetate to give the modified soft resin (B-1) or (B-2) having a non-volatile matter concentration of 50% In Table 3, the used materials and the amounts thereof are shown. Further, Table 3 shows the molecular weights measured by GPC method of thus obtained modified soft resins (B-1) and (B-2).

TABLE 3

|  | Ref. Ex. 5 (g) | Ref. Ex. 6 (g) |
| --- | --- | --- |
| n-Butyl acrylate | 31 | 31 |
| Methyl methacrylate | 35 | 35 |
| n-Butyl methacrylate | 34 | 34 |
| γ-Methacryloyloxypropyl-methyldimethoxysilane | 25 | 25 |
| n-Dodecylmercaptan | 2.5 | 0.5 |
| Azobisisobutyronitrile | 8.0 | 8.0 |
| Soft resin (a-1) | 190 | — |
| Soft resin (a-2) | — | 190 |
| Number average molecular weight | 8,500 | 7,300 |
| Resin name | B-1 | B-2 |

Example 1 and Comparative Example 1

To 100 parts (as solid matter) of the vinyl resin (A-2) were added 2 parts of dioctyl tin dimaleate as the curing catalyst (C) and 30 parts (as solid matter) of the modified soft resin (B-1), and the mixture was diluted with a thinner. Then, the diluted mixture was coated on a defatted aluminium plate (Construction material: A 1050, thickness: 0.8 mm) so as to give a dried coating having a thickness of 30 μm. The coated plate was baked at 140° C. for 20 minutes. The physical properties of the coating were estimated and the results of evaluation are shown in Table 4.

The same manner as the above-mentioned procedure except the modified soft resin (B-1) was not added was repeated as Comparative Example 1. The physical properties of the coating obtained in Comparative Example 1 were estimated. Also, the results of the evaluation are also shown in Table 4.

TABLE 4

|  | Ex. 1 | Com. Ex. 1 |
| --- | --- | --- |
| Pencil hardness | H | H |
| Impact resistance | 500 g × 40 cm | 300 g × 10 cm |
| Adhesion | 10 | 7 |

The impact resistance was estimated by vertically falling a weight on the coated plate. In Table 4, as the impact resistance are shown weight (g) and height (cm) of the used weight which did not cause any crack in the coating on the plate used in the estimation.

As the adhesion in Table 4, degree of peeling was estimated on ten levels by cross cutting a film to 1 mm squares (1 mm × 1 mm) and then peeling the squares off with a cellophane adhesive tape. The level "10" means no peeling.

Examples 2 and 3, and Comparative Example 2

To 100 parts (as solid matter) of the vinyl resin (A-1) was added 150 parts (as solid matter) of the modified soft resin (B-1) or (B-2). Sucessively therein was dispersed titanium oxide (trade code "CR 95", commercially available from Ishihara Industry Kabushiki Kaisha) so as to give a white enamel having a PWC (% by weight of the pigment based on the total solid matter) of 30% and a solid concentration of 60%. Titanium oxide was dispersed for 2 hours with glass beads by means of a paint shaker.

To 100 parts of thus obtained white enamel was added 2 parts of the reaction product (commercially available under the trade code "No. 918" from Sankyo Yukigosei) of dibutyl tin oxide and DOP (2-ethylhexyl phtalate) as the curing catalyst (C) and then diluted with a thinner. Sucessively, the diluted mixture was coated on each of a polyethylene film and an aluminum plate to prepare test pieces. The prepared test pieces were allowed to stand for 1 week at room temperature. Then the physical properties of the coating were estimated. The results of the estimation are shown in Table 5.

TABLE 5

|  | Ex. 2 | Ex. 3 | Com. Ex. 2 |
| --- | --- | --- | --- |
| Composition |  |  |  |
| A-1(parts) | 100 | 100 | 100 |
| B-1(parts) | 150 | — | — |
| B-2(parts) | — | 150 | — |
| Physical properties of coating |  |  |  |
| Compatibility | Excellent | Excellent | — |
| Elongation | 120 | 100 | 3 |
| Stain resistance |  |  |  |
| Accelerated | 9 | 10 | 10 |
| Outdoor exposed | 10 | 10 | 10 |

The tests for estimating the physical properties of coating in Table 5 were carried out according to the following methods.

Compatibility:

The composition of Example 2 or 3 was coated on a glass plate and dried at 50° C. for 1 hour to give a film having a thickness of approximately 1 min. Then, state of the film was rated with the eyes with an index "excellent", "good" or "poor". The index "excellent", "good" and "poor" mean "transparent", "slightly haze" and "haze", respectively.

Elongation:

Elongation was estimated by using a universal tensile tester (commercial available under the trade name "Autograph" from SHIMADZU CORPORATION under the conditions of the temperature: 23° C., the load: 5 kg and the rate of tension: 200 mm/min.

Accelerated stain resistance:

Twenty-four hours after coating the coating material on a test piece, the test piece was coated with a 2% of an aqueous slurry of carbon, and allowed to stand for 24 hours. Then, a gummed cloth tape was adhered to the test piece under pressure. The gummed cloth tape was stripped from the test piece. Released carbon was removed by the gummed cloth tape. Degree of stains of carbon on the gummed cloth tape was estimated in ten levels on the basis of color difference ($\Delta E$) on the adhesable face of the gummed cloth tape before and after the test. The level "10" means no color difference.

Stain resistance to outdoor exposure:

Test pieces were exposed in a certain place in Kagoshima-shi and then degree of stain was estimated in ten levels on the basis of color difference ($\Delta E$) of the test piece before and after the test. The level "10" means no color difference.

In addition to the ingredients used in the Examples, other ingredients can be used in the Reference Examples and Examples as set forth in the specification to obtain substantially the same results.

What is claimed is:

1. A curable composition comprising:
   (A) a vinyl resin having at least one hydrolyzable silyl group in one molecule wherein the main chain substantially consists of a vinyl polymer and having no segment of a resin which has polymerizable double bonds at both ends of the main chain and a glass transition temperature of not more than 0° C.;
   (B) a modified having at least one hydrolyzable silyl group in one molecule which is obtained by polymerizing:
      (a) a resin having a number average molecular weight of from 2,000 to 20,000 polymerizable double bonds at both ends of the main chain and a glass transition temperature of not more than 0° C.,
      (b) a hydrolyzable silyl group-containing vinyl monomer, and
      (c) a vinyl monomer having no hydrolyzable silyl group; and
   (C) a curing catalyst.

2. The composition of claim 1, wherein said curing catalyst (C) is an organotin compound, an acid phosphate, a reaction product of an amine with an acid phosphate, an amine, an organic titanium compound, an organic aluminum compound, or a mixture thereof.

3. The composition of claim 1, wherein said resin (a) of said modified resin (B) is at least one polymer or oligomer selected from the group consisting of a polyester, a polyether, a polycarbonate and an olefin oligomer.

4. The composition of claim 3, wherein said resin (a) includes a polyester which is at least one member selected from the group consisting of polycaprolacton and polyvalerolacton.

* * * * *